United States Patent
Montague et al.

(10) Patent No.: US 6,506,230 B2
(45) Date of Patent: *Jan. 14, 2003

(54) METHOD FOR INCREASING PRODUCTIVITY OF DIRECT REDUCTION PROCESS

(75) Inventors: Stephen C. Montague, Midland; Russell Kakaley, Charlotte; Gregory D. Hughes, Charlotte; Gary E. Metius, Charlotte, all of NC (US)

(73) Assignee: Midrex Technologies, Inc., Charlotte, NC (US)

(*) Notice: Subject to any disclaimer, the term of this patent is extended or adjusted under 35 U.S.C. 154(b) by 46 days.

This patent is subject to a terminal disclaimer.

(21) Appl. No.: 09/781,816

(22) Filed: Feb. 12, 2001

(65) Prior Publication Data

US 2001/0003930 A1 Jun. 21, 2001

Related U.S. Application Data

(63) Continuation-in-part of application No. 09/456,111, filed on Dec. 7, 1999, which is a continuation-in-part of application No. 08/924,686, filed on Sep. 5, 1997, now Pat. No. 5,997,596.

(60) Provisional application No. 60/181,945, filed on Feb. 11, 2000.

(51) Int. Cl.$^7$ ............................................. C21B 13/00
(52) U.S. Cl. ............................. 75/381; 75/385; 75/496; 75/505
(58) Field of Search .......................... 75/505, 496, 381, 75/385

(56) References Cited

U.S. PATENT DOCUMENTS 5,997,596 A * 12/1999 Joshi et al. .................. 266/197

* cited by examiner

Primary Examiner—Melvyn Andrews
(74) Attorney, Agent, or Firm—Dougherty & Clements LLP

(57) ABSTRACT

An improved method and apparatus for increasing the productivity of a direct reduction process in which iron oxide is reduced to metallized iron by contact with hot reducing gas; comprising the steps of: a) providing a first hot reducing gas consisting essentially of CO and $H_2$; b) providing additional reducing gas by reaction of a gaseous or liquid hydrocarbon fuel with oxygen; c) mixing the first hot reducing gas with the additional reducing gas to form a reducing gas mixture; d) enriching the reducing gas mixture by the addition of a gaseous or liquid hydrocarbon; e) injecting oxygen or oxygen-enriched air into the enriched mixture; and f) introducing the enriched mixture into an associated direct reduction furnace as reducing gas.

6 Claims, 1 Drawing Sheet

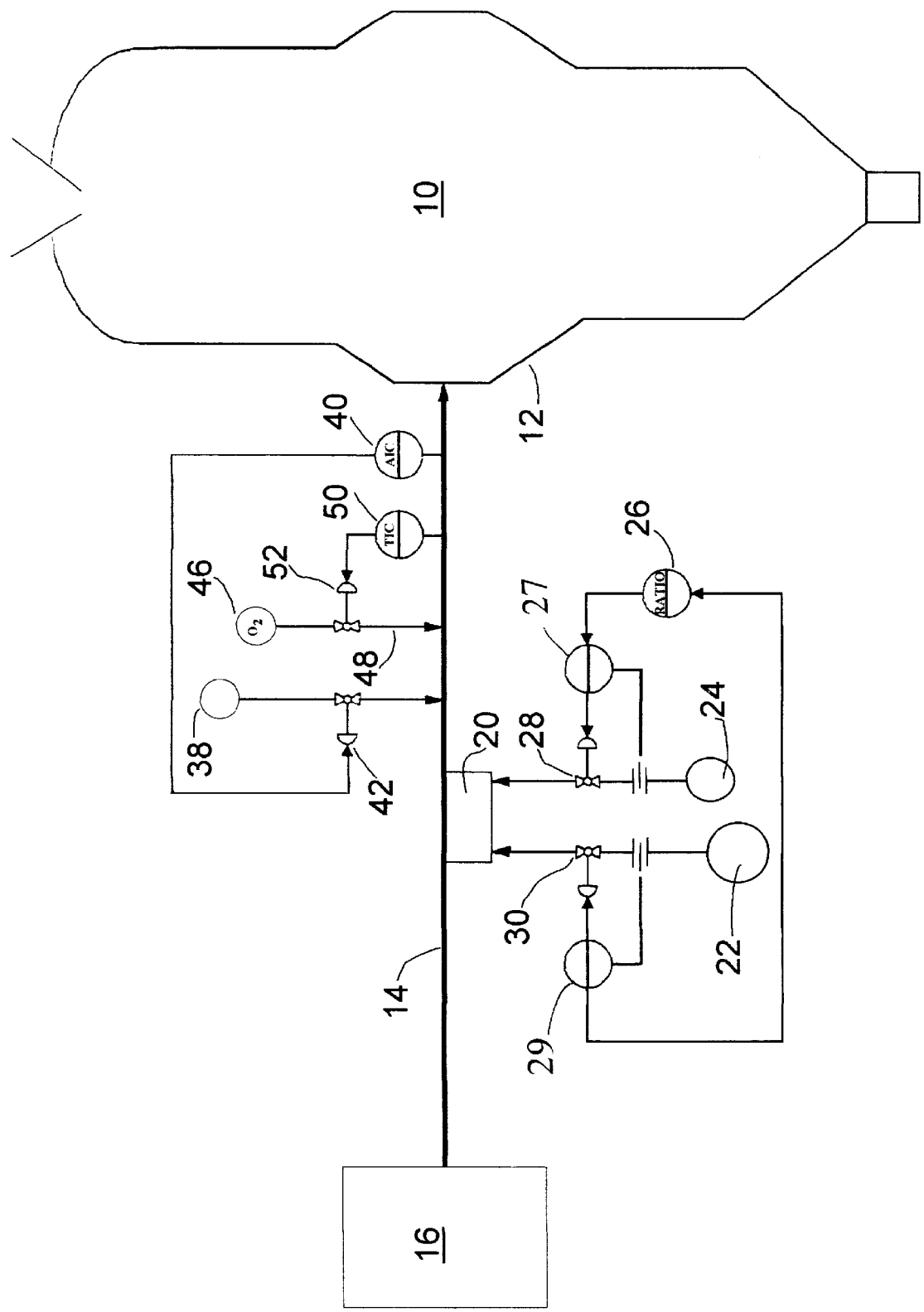

METHOD FOR INCREASING PRODUCTIVITY OF DIRECT REDUCTION PROCESS

CROSS REFERENCE TO RELATED APPLICATIONS

This application claims the benefit of U.S. Provisional Application No. 60/181,945, filed on Feb. 11, 2000, and is a continuation in part of co-pending U.S. patent application Ser. No. 09/456,111, filed Dec. 7, 1999, which is a continuation in part of U.S. patent application Ser. No. 08/924,686, filed Sep. 5, 1997, now U.S. Pat. No. 5,997,596, which issued Dec. 7, 1999.

FIELD OF THE INVENTION

The present invention relates to a method and apparatus for increasing the productivity of a direct reduction process for the production of metallized iron or other metal, and more particularly to apparatus and methods for increasing the amount of reductant in bustle gas of a direct reduction furnace while controlling the optimum bustle gas temperature and controlling the optimum bed temperature.

BACKGROUND OF THE INVENTION

In the Midrex direct reduction process, reduction of iron oxides to metallized iron is accomplished by forming a bed of iron containing burden, such as iron oxide in pellet or lump form, in a shaft furnace injecting a heated reduction gas, typically a mixture of hydrogen and carbon monoxide, into the burden for a sufficient period of time to accomplish substantially complete reduction of the oxides to metallized iron. The reduction gas is typically injected into the burden using a bustle and tuyere system.

The problem presented is how to increase productivity of new and existing Direct Reduction furnaces without increasing the capacity of traditional reducing gas equipment.

The current state of the art to solve this problem is focused on four areas:

1) Enrichment Addition—for in-situ reforming within the reduction furnace;
2) Oxygen Injection to increase furnace bed temperatures for higher utilization;
3) High Enrichment Addition and Oxygen Injection—primarily for in-situ reforming within the reduction furnace;
4) Oxy-fuel Burners—to generate reductant outside of the furnace.

Each of the above items has some problems, which are described below:

1) Enrichment Addition—A hydrocarbon fuel (such as natural gas, methane, ethane, butane, propane, naphtha) is added to the bustle gas stream. The bustle gas methane can be controlled to prevent methanation. This methane is the chemical feedstock for in-situ reforming inside the furnace therefore increasing production by making more reductant. However, in-situ reforming consumes heat, so high amounts of enrichment addition reduce furnace bed temperatures. Lower bed temperatures result in less utilization of the reductant and a decrease in the kinetics of the reduction reactions. If bed temperatures become too low, then chemical equilibrium will favor the carburizing reactions $2CO \rightarrow [C] + CO_2$ and $CO + H_2 \rightarrow [C] + H_2O$ which consume part of the reductant and form oxidants.

2) Oxygen Injection is used in many Direct Reduction plants today, usually with low bustle gas methane levels (around 2.5%) to maintain bed temperatures around 900° C., which is just below the clustering point of the burden material. The small amount of enrichment addition can be used to balance bed temperatures. High bustle gas temperatures allow furnace bed temperatures to be maximized. Higher bed temperatures increase the kinetics of the reduction reactions, increasing utilization of reductant, and yielding higher furnace productivity. A small amount of in-situ reforming can result from the enrichment addition. However, all equipment from the oxygen injection point and through the furnace are subject to the higher temperatures, with attendant higher risk of clustering of the burden, and higher maintenance requirements for the equipment. Oxygen injection is limited when the bustle gas temperature or furnace bed temperature is high enough to cause clustering of the material in the furnace. Much of the injected oxygen burns with the $H_2$ and CO already present in the gas stream resulting in higher temperatures but less reductant and lower quality (since $H_2O$ and $CO_2$ are produced). In short, current oxygen injection systems vary oxygen flow to control temperature and some systems vary natural gas flow to control methane levels without the ability to increase the amount of reductant generated or the quality of the gas stream. The quality of the reducing gas is defined by the ratio of reductants $(H_2+CO)$ to oxidants $(CO_2+H_2O)$, the higher quality being the better. A typical value for the reductants-to-oxidants ratio is about 12 to 1, with a $H_2/CO$ ratio of 1.5 to 1.

3) High Enrichment Addition and Oxygen Injection. When a combination of oxygen injection and high enrichment addition is used, furnace bed temperatures are not maximized. Operating with high bustle gas methane (around 6%) maximizes in-situ reforming in the reduction furnace, with a consequence that the furnace bed temperatures are in the range of 800 to 820° C. Production is increased, primarily by in-situ reforming. Some small gain in productivity may be realized by slight increases in bed temperatures through higher utilization and improved kinetics of the reduction reactions. Unfortunately, the extent to which pure oxygen and natural gas can be injected is limited by the high bustle gas temperatures which may cause clustering at the port tiles, that is, the point where the bustle gas enters the furnace. If the furnace bed temperature is low, then residual reductant in the top gas will be higher after the reduction reactions occur, and residual methane in the top gas will be higher after the in-situ reforming reactions occur, which results in a top gas with a higher heating value. When this heating value exceeds the heat needed by the reducing process, export fuel is generated. This increases the natural gas consumption of the process without providing a benefit other than export fuel.

4) Oxy-fuel Burners are unproven in DR plants. Oxy-fuel burners have the ability to generate reducing gas outside of the reduction furnace without significantly increasing bustle gas temperatures. The reductant generated is higher quality than can be achieved if the same amount of oxygen and natural gas were added through the typical oxygen injection+enrichment system. However, Oxy-fuel burners may not have the capability to produce reducing gas at the desired bustle gas temperature. The reducing gas generated by the oxy-fuel burners will not have the excess heat needed to maintain high furnace bed temperatures. For the oxy-fuel burners to produce high quality reducing gas, the ratio of oxygen to fuel must be controlled within precise limits. This ratio prohibits the oxy-fuel burners from supplying the temperature boost to the bustle gas that is required. If the oxy-fuel burner is operated at an oxygen/fuel ratio that is too high, then the burner can be destroyed by the high temperatures. Conversely, if the burner is operated at an oxygen/fuel ratio that is too low, then carbon could be formed, thus plugging the burner. It is possible that a larger number of oxy-fuel burners could be used to increase the bustle gas temperature, but this would prevent the plant from operating the burners to produce low quantities of additional reducing gas when operating at high furnace bed temperatures. Of course the need for more oxy-fuel burners to raise the bustle gas temperature would also require more capital investment.

RELATED PRIOR ART

The Midrex Direct Reduction Process is embodied in Beggs U.S. Pat. Nos. 3,748,120 and 3,749,386.

SUMMARY OF THE INVENTION

The invention provides a method and apparatus for increasing the productivity of a direct reduction process in which iron oxide is reduced to metallized iron by contact with hot reducing gas; comprising the steps of: a) providing a first hot reducing gas consisting essentially of CO and $H_2$; b) providing additional reducing gas by reaction of a hydrocarbon fuel with oxygen; c) mixing the first hot reducing gas with the additional reducing gas to form a reducing gas mixture; d) enriching the reducing gas mixture by the addition of a gaseous or liquid hydrocarbon; e) injecting oxygen or oxygen-enriched air into the enriched mixture; and f) introducing the enriched mixture into an associated direct reduction furnace as reducing gas. Oxy-fuel burners supplement reducing gas flow.

The apparatus consists of a source of reducing gas communicating with a reduction furnace via a gas conduit, an oxy-fuel burner communicating with the gas conduit, means for injecting additional hydrocarbons into the gas conduit as enrichment gases, means for injecting oxygen into the gas conduit, and associated monitors, sensors, and controls.

OBJECTS OF THE INVENTION

The principal object of the present invention is to provide an improved method of increasing the amount of reductant in bustle gas of a direct reduction furnace while controlling the optimum bustle gas temperature and controlling the optimum bed temperature.

A further object of this invention is to provide apparatus to carry out the above method.

Another object of the invention is to increase the productivity of a direct reduction furnace without increasing the capacity or size of traditional reducing gas equipment.

BRIEF DESCRIPTION OF THE DRAWING

The foregoing and other objects will become more readily apparent by referring to the following detailed description and the appended drawing in which:

The single drawing FIGURE is a schematic flow diagram of a preferred embodiment of the invention.

DETAILED DESCRIPTION

In order to increase productivity of new and existing Direct Reduction furnaces without increasing the capacity of traditional reducing gas equipment, the present invention utilizes oxy-fuel burners, enrichment gas addition and oxygen injection. This process maximizes in-situ reforming while maximizing reduction kinetics.

Controlling the optimum bustle gas temperature to greater than 900° C. provides the heat needed for in-situ reforming and maximizes the quality of reducing gas in the furnace. Controlling the optimum bed temperature to greater than 850° C. promotes reaction kinetics, increases utilization of reductant, provides heat which can be used for carbon cracking in the lower cone of the furnace, and reduces the generation of export fuel.

Referring now to the drawing, a direct reduction furnace, such as shaft furnace 10, has a bustle and tuyere system 12 communicating with a reducing gas conduit 14. Hot reducing gas from source 16 is fed into the conduit. One or more oxy-fuel burners 20 are arranged to communicate with the conduit 14. Each burner is fed with natural gas or other hydrocarbon fuel, such as methane, ethane, butane, propane, naphtha, or a mixture of any of them, from source 22. Oxygen is supplied to the burner from oxygen source 24.

Multiple oxy-fuel burners 20 may be used to generated reducing gas. The size and quantity of these burners will vary depending on the supplier and the plant requirements or limitations. The oxygen/fuel ratio to the burners is adjusted in order to generate a high quality reducing gas. Oxy-fuel burners supplement the reducing gas flow to the direct reduction furnace. The oxygen/fuel ratio can be controlled to maximize the quality $[(H_2+CO)/(H_2O+CO_2)]$ of the reducing gas generated. The oxy-fuel burner can be operated at the optimum ratio to maximize quality without exceeding burner temperature limits. The desired ratio is entered into controller 26 which controls the amount of oxygen flowing through valve 28 and into burner 20 via flow control 27. Similarly, controller 26 controls the amount of hydrocarbon gas that flows through valve 30 and into burner 20 via flow control 29.

Hydrocarbon gas enrichment addition is accomplished by injection of natural gas or other hydrocarbons, such as methane, ethane, butane, propane, naphtha, or a mixture of hydrocarbons from source 38 into conduit 14 upstream of the bustle 12. The enrichment flow is controlled by methane analysis of the bustle gas by gas analyzer 40 adjacent to the bustle 12. Analyzer 40 communicates with hydrocarbon flow controller 42, the operation of which indirectly controls the furnace bed temperature. The enrichment addition allows the furnace bed temperatures to be independently and precisely controlled and optimized. The enrichment flow is adjusted to obtain higher bed temperatures for higher utilization of reducing gas and lower generation of export fuel. The higher bed temperatures can be utilized in the lower cone of the furnace to add product carbon and generate additional reductant in the furnace. The enrichment addition can be either preheated or non-preheated.

Oxygen injection controls the bustle gas temperature. Oxygen can be injected into the reducing gas conduit 14 through a single pipe 48 or through a multi-nozzle arrangement. Other more complicated systems can also be used to inject the oxygen such as an optimized oxygen injection system which combines the enrichment addition and oxygen injection features into one piece of equipment. Temperature monitor 50 communicates with the reducing gas conduit 14, and controls the operation of oxygen flow controller 52 to optimize the temperature of the bustle gas.

Oxygen injection allows the bustle gas temperature to be independently and precisely controlled and optimized. The bustle gas temperature is adjusted as high as possible without causing clustering at the port tiles. Higher bustle gas temperatures provide the energy needed for in-situ reforming resulting in higher quality furnace gas. The high temperatures also provide the energy needed to maintain high bed temperatures.

Any of the fuels or oxygen can be cold or preheated in the invented process. The sequence of oxygen injection and enrichment may be reversed, if desired.

The optimum productivity is achieved by maximizing the reducing temperature of the burden and the quality of the reducing gas entering the shaft furnace. These two factors are the keys to optimizing the production of any direct reduction furnace and its related gas generating equipment. By utilizing oxygen injection and oxy-fuel burners, as shown on the FIGURE, as well as maintaining the natural gas in the reducing gas stream, it is possible to independently control the shaft furnace burden temperature and the reducing gas temperature. This permits the operator to maximize the performance of the shaft furnace by maximizing the utilization of the reducing gases within the furnace.

SUMMARY OF THE ACHIEVEMENT OF THE OBJECTS OF THE INVENTION

From the foregoing, it is readily apparent that we have invented an improved method and apparatus for increasing the amount of reductant in bustle gas of a direct reduction furnace while controlling the optimum bustle gas temperature and controlling the optimum bed temperature.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method for increasing the productivity of a direct reduction process in which iron oxide is reduced to metallized iron by contact with hot reducing gas; comprising:
   a) providing a first hot reducing gas consisting essentially of CO and $H_2$;
   b) providing additional reducing gas by reaction of a gaseous or liquid hydrocarbon fuel with oxygen;
   c) mixing said first hot reducing gas with said additional reducing gas to form a reducing gas mixture;
   d) enriching said reducing gas mixture by the addition of a gaseous or liquid hydrocarbon;
   e) injecting oxygen or oxygen-enriched air into said enriched mixture; and
   f) introducing said enriched mixture into an associated direct reduction furnace as reducing gas.

2. A method according to claim 1, wherein said hydrocarbon fuel in step b is selected from the group consisting of natural gas, natural gas liquids, methane, ethane, butane, pentane, propane, naphtha, fuel oil, or a mixture thereof.

3. A method according to claim 1, further comprising controlling the bustle gas temperature by monitoring the temperature of the bustle gas and adjusting the rate of oxygen injection.

4. A method according to claim 1, further comprising controlling the ratio of oxygen and fuel provided to said oxy-fuel burner.

5. A method according to claim 1, further comprising monitoring the temperature of the enriched gas mixture and adjusting the rate of injection of said gaseous or liquid hydrocarbon responsive thereto.

6. A method according to claim 1, further comprising monitoring the quality of the enriched gas mixture and adjusting the rate of injection of oxygen or oxygen enriched air responsive thereto.

* * * * *